Patented Nov. 7, 1944

2,362,143

UNITED STATES PATENT OFFICE 2,362,143

METHOD OF OBTAINING FOLLICLE-STIMULATING HORMONE

William H. McShan and Roland K. Meyer, Madison, Wis., assignors to Wisconsin Alumni Research Foundation, Madison, Wis., a corporation of Wisconsin No Drawing. Application August 3, 1940, Serial No. 351,198

7 Claims. (Cl. 167—74)

The anterior pituitary gland of animals such as the horse, sheep, and swine contains a hormone which stimulates the ovaries and testes of animals. This hormone stimulates the growth of the follicles, produces ovulation and corpora lutea formation in the ovaries of the female while the uterus is stimulated indirectly. In the male the germinal epithelium and interstitial cells of the testes are stimulated which results in the production of sperm, and also in the stimulation of the accessories such as the seminal vesicle and prostate gland.

This gonadotropic hormone complex consists of two biologically active substances one of which (the follicle stimulating fraction) stimulates the follicles in the ovary of the female and the germinal epithelium in the testis of the male, while the other fraction (the luteinizing fraction) stimulates the formation of corpora lutea in the ovary of the female and the interstitial cells in the testis of the male.

The object of our invention is to obtain the follicle stimulating fraction free, or substantially free, of luteinizing activity, and adrenotropic, lactogenic, or thyrotropic hormone.

We have discovered that trypsin, a proteolytic enzyme produced by the pancreas, acts on the pituitary gonadotropic complex differentially in that it destroys the luteinizing activity, while the follicle-stimulating activity remains relatively unimpaired, and we provide a method which includes the use of trypsin, by which a highly active and purified follicle-stimulating fraction is obtained.

In accordance with our invention, the gonadotropic activity of the anterior pituitary gland is extracted from the gland, an aqueous solution thereof adjusted to a given pH and digested for a definite period of time with trypsin or a pancreatic enzyme preparation that contains trypsin. The trypsin and inert materials are then removed, leaving the follicle-stimulating activity free of luteinizing activity.

In accordance with our method the gonadotropic activity obtained in any suitable manner from the pituitary gland, in the form of an extract, is recovered by precipitation with an organic solvent such as acetone. The precipitate is separated by centrifuging, suspended in a definite volume of water and supercentrifuged after which the aqueous extract is adjusted to the proper pH and digested for a definite period of time with trypsin or a pancreatic enzyme preparation that contains trypsin. The trypsin is removed from the digest by heating followed by the separation of inert material by dialysis against a suitable buffer solution. The follicle-stimulating activity is contained in the dialyzed digest, and is recovered therefrom in the form of a fine white powder by precipitation with an organic solvent such as ethyl alcohol followed by dehydration.

An example of the method of preparation is given in detail as follows: Acetone-dried sheep pituitary powder in 500 gram quantities is extracted by shaking with distilled water in the proportion of 1 liter of water to 100 grams of powder. Other solvents such as dilute aqueous pyridine or dilute sodium hydroxide solution whose pH is not greater than 9 are satisfactory for use in the extraction. Two extractions are made and the extracts which are obtained by centrifuging are combined and clarified by supercentrifugation. The gonadotropic activity is precipitated by the addition of the combined extracts to 4 volumes of acetone followed by stirring. The precipitation is facilitated also by the addition of 3 or 4 drops of saturated sodium chloride solution for each liter of the aqueous mixture. The precipitate is collected by centrifugation and suspended in water so that 1 cc. is equivalent to 250 mgm. of original pituitary powder.

To this supercentrifuged extract is added trypsin and the mixture adjusted to pH 8 by the addition of 5N sodium hydroxide solution. The amount of trypsin to be added is determined on the basis of 40 mgm. of trypsin per gram of original pituitary powder. The mixture is then treated at 37° C. for 3.5 hours. This brings about a process of digestion which destroys the luteinizing activity and leaves practically unchanged or unaffected the follicle-stimulating fraction. The inactive material which precipitates during the digestion process is separated from the aqueous digest by centrifuging after which the aqueous digest is decanted into centrifuge tubes. The trypsin is now precipitated for the purpose of removal from the digest, by heat. This heating is accomplished by placing the centrifuge tubes in a water bath which is maintained at a temperature of 75° C. for 20 minutes. The precipitated trypsin is separated from the heated digest by centrifuging. This heat treating operation removes the trypsin completely from the digest and does not change or affect the follicle-stimulating fraction.

This heat-treated digest which contains the follicle-stimulating activity is placed in Cellophane tubes and dialyzed against 0.1 M acetate buffer of pH 4. The dialysis of the heated digest adjusts the digest to pH 4 and results in the formation of a precipitate which is inactive and may be toxic to animals. For this reason the pH adjustment should be carefully executed in order to completely remove this inactive precipitate. That the inactive material is completely precipitated is indicated by the fact that the supernatant liquid is clear after the material is separated by centrifuging.

The final product is obtained in solid form by the addition of this clear supernatant liquid, which has been adjusted to pH 4, to 4 volumes of 95 per cent ethyl alcohol followed by stirring and the addition of 2 or 3 drops of 2 N HCl for each 100 grams equivalent of original pituitary powder. This results in a fine white precipitate which is collected by centrifuging and dehydrated by washing with alcohol and acetone. The dehydrated precipitate is placed under vacuum in a desiccator in order to remove completely the solvents used in the dehydration. This dry material is the follicle-stimulating fraction and is prepared for administration by dissolving it in the desired volume of water. The solution of the powder is sterilized by Seitz filtration without loss of follicle-stimulating activity.

We have hereinbefore referred to the proteolytic enzyme trypsin for digestion of the pituitary extract. We have carried out our method effectively with trypsin in crystalline form. However from the commercial standpoint crystalline trypsin is not sufficiently available, and we have found that the method can be carried out effectively with various commercial preparations containing trypsin now on the market or commercially available. It is desirable that these preparations be low in diastase activity.

If desired a great part of the luteinizing, lactogenic and thyrotropic hormone activities can be saved by separating them from the combined aqueous extract before the digestion with trypsin is made. This separation is made by adjusting the pH of the combined aqueous extract to 4 by dialysis against 0.1 M acetate buffer of pH 4, and removal of the precipitate that forms and which contains approximately 75 per cent of the luteinizing activity as wells as some thyrotropic and lactogenic hormone activties by centrifugation. This pH 4 supernatant liquid which contains the greater part of the follicle-stimulating activity together with the remaining luteinizing activity is treated in accordance with the procedure hereinbefore described for the preparation of the follicle-stimulating fraction.

*Chemical and physical characteristics.*—The follicle-stimulating fraction is highly soluble in water, it does not dialyze through Cellophane membranes, and it does not decrease in activity when kept in solution at 2° C. for six months. The material is stable in aqueous solution at pH 7 to 8 when heated at 75° C. for thirty minutes, and the dry form remains active when heated in the dry chamber of the autoclave under 15 pounds of steam pressure for 1.5 hours. This fraction also contains a high percentage of carbohydrate.

*Physiological characteristics.*—The follicle-stimulating fraction is effective in causing follicle development and ovulation in the ovaries of the cow. Furthermore, we have evidence that this fraction stimulates the ovaries of sterile cows.

The results from many clinical human cases indicate that the follicle-stimulating fraction made by our method is effective in the stimulation of undeveloped ovaries in the human being. The ovaries are well stimulated in many cases, and there was little or no local reaction. These results indicate that this fraction is effective in the treatment of the human female.

Immature normal rats that were 21 days old were used in the assay of this fraction. The fraction was highly effective as evidenced by the increase in the normal weight of 13 mgm. for the unstimulated to an average weight of 65 mgm. for the stimulated ovaries, by greatly distended uteri and by open vaginae. Macroscopic examination of the ovaries at the time of autopsy revealed the presence of only follicles while microscopic examination of the sectioned ovaries showed that virutally no lutein tissue was present.

We claim:

1. The method of obtaining the follicle-stimulating fraction from the pituitary gland which consists in digesting a gonadotropic extract of the pituitary gland with trypsin, and then removing the trypsin by the application of heat.

2. The method of obtaining the follicle-stimulating fraction from the pituitary gland which consists in digesting a gonadotropic extract of the pituitary gland with trypsin, removing the trypsin by the application of heat, and removing inert material by dialysis against the proper buffer solutions.

3. The method of obtaining the follicle-stimulating fraction from the pituitary gland which consists in digesting a gonadotropic extract of the pituitary gland with trypsin, and then removing the trypsin by the application of heat at approximately 75° C. for approximately 20 minutes.

4. The method of obtaining the follicle-stimulating fraction from the pituitary gland which consists in digesting a gonadotropic extract of the pituitary gland with trypsin, removing the trypsin by the application of heat at approximately 75° C. for approximately 20 minutes, and removing inert material by dialysis against 0.1 M acetate buffer solution of pH 4.

5. The method of obtaining the follicle-stimulating fraction from the pituitary gland which consists in digesting a gonadotropic extract of the pituitary gland with trypsin, removing the trypsin by the application of heat, removing inert material by dialysis against the proper buffer solutions, and removing the follicle-stimulating fraction from the supernatant extract by precipitation with organic solvents.

6. The method of obtaining the follicle-stimulating fraction from the pituitary gland which consists in digesting a gonadotropic extract of the pituitary gland with trypsin with the mixture adjusted to pH 8 for 3–5 hours at approximately 37° C., removing the trypsin by the application of heat at approximately 75° C. for approximately 20 minutes, removing inert material by dialysis against 0.1 M acetate buffer solution of pH 4, recovering the follicle-stimulating fraction from the supernatant extract by precipitation with ethyl alcohol, and collecting the active fraction by centrifugation followed by dehydration by ethyl alcohol and acetone.

7. The method of obtaining the follicle-stimulating fraction from the pituitary gland which consists in destroying the activity of the luteinizing fraction of a gonadotropic extract of the pituitary gland by digesting the extract with a preparation containing trypsin, removing the trypsin by the application of heat, and then separating out from said digested extract the follicle-stimulating fraction.

WILLIAM H. McSHAN.
ROLAND K. MEYER.